UNITED STATES PATENT OFFICE.

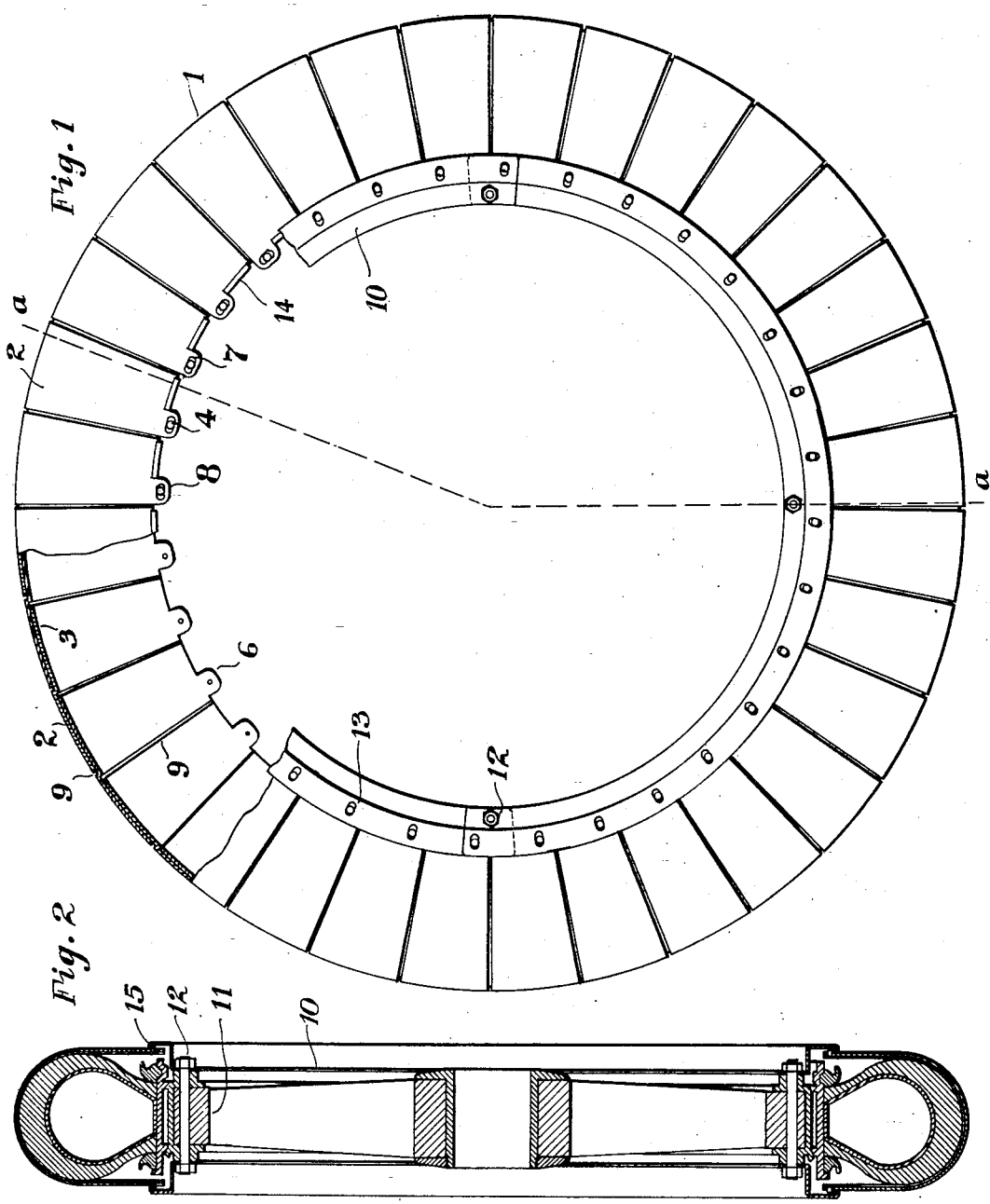

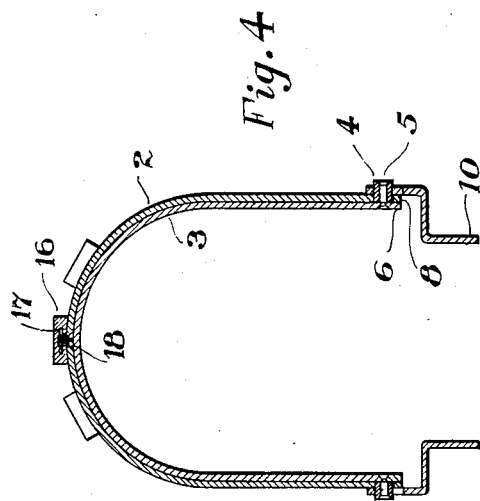
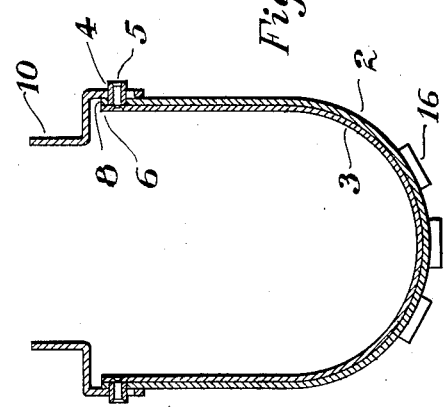
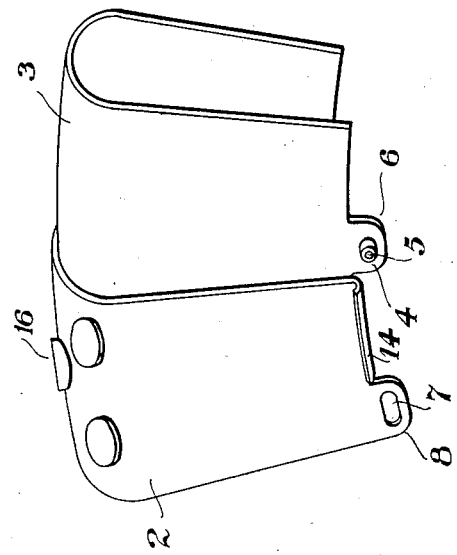
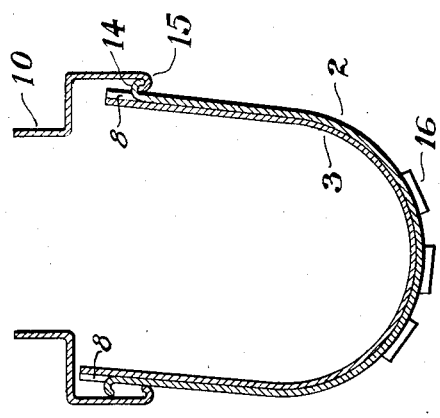

FRANK H. BRUEGGEMANN, OF NORWOOD, OHIO, ASSIGNOR OF ONE-FOURTH TO J. W. HEINTZMAN, OF CINCINNATI, OHIO, AND ONE-FOURTH TO HARRY P. ROHMANN, OF NORWOOD, OHIO.

FLEXIBLE METALLIC PROTECTOR FOR RUBBER TIRES.

1,186,467. Specification of Letters Patent. Patented June 6, 1916.

Application filed February 3, 1913. Serial No. 745,874.

*To all whom it may concern:*

Be it known that I, FRANK H. BRUEGGEMANN, a citizen of the United States, residing at Norwood, in the county of Hamilton and State of Ohio, have invented certain new and useful Improvements in Flexible Metallic Protectors for Rubber Tires, of which the following is a specification.

My invention relates to simple, efficient and economical means for covering and protecting rubber tires.

The object of my invention is to provide a sectional, flexible metallic covering for rubber tires which will prevent any damage to the same in use.

A further object is to insure a tire protector which will lengthen the life of the tire by preventing puncture by nails, glass and otherwise, to prevent tires from expanding sufficiently to blow up, to arrest the rapid wearing of treads or casings of tires and to prevent tires from being forced off of wheels by high rate of speed or heavy side pressure as in case of skidding.

My invention consists in a device that is described or suggested in the following description and illustrated in the drawings and any modifications thereof which are covered by the claims.

Referring to drawings: Figure 1 is a side view of the protector, part of segments in section and part of ring broken away for clearness in describing my invention. Fig. 2 is a sectional detail of casing on line $a$—$a$, of Fig. 1. Fig. 3 is a perspective view of one of the segments. Fig. 4 is a sectional detail showing protector at rest. Fig. 5 is a similar sectional view as Fig. 4, but showing protector subjected to a downward force. Fig. 6 is a sectional detail view showing protector subjected to a side force.

In the drawings, and as illustrated, 1 indicates a segment and its contiguous segments, 2 a tread member of segment, 3 a neck or depressed member of segment allowing the tread member 2 of its contiguous segment 1, to overlap said member.

4 is a roller and 5 a pin carrying said roller and fastened to lug 6 of neck member 3, roller 4 engaging in slot 7 located on lug 8 of tread member 2. Slot 7 has a lateral clearance for roller 4, allowing circumferential movement of segments.

9 represents the clearance between the segments provided by slot 7 in segments.

10 is a ring fastened to felly 11 by means of bolts 12. Slots 13 in ring 10 have a radial clearance and engage roller 4.

As the weight of the vehicle is carried by the wheels and the tires being resilient, the resultant lines of force will be upward and outward.

From the description thus far explained it will be readily understood that the protector consists of a plurality of segments having a circumferential and radial flexibility conforming with the tire when in action.

Proceeding with the description, 14 is a reflexed edge on segment 1, and 15 a reflexed edge on ring 10 interlocking with edge 14. Assuming the wheel to be raised from contact with the road and the tire inflated, it will be seen that undue expansion of the tire will be arrested by means of said reflexed edges, thereby preventing the blowing out of tires and in case of vehicles skidding the forcing off of the tire will be arrested by the above mentioned edges. I provide an anti-skidding and noise lessening device by means of rubber buttons conveniently located on tread of protector.

16 is a rubber button cast over washer 17 and fastened to segments by means of screws 18, inserted through holes provided in tread member 2 of segments.

It may readily be seen that the renewal of buttons when worn out can be accomplished in a very short space of time and with little expense, also that the neck member 3 of segments will prevent the screw 18 of button 16, being forced into casing of tire, thereby injuring the same.

My invention provides for a protector, made from some metallic substance preferably sheet steel of a suitable thickness having a flexibility conforming to the resiliency of a rubber tire and entirely incasing said tire, thus preventing injury to tire in any manner while in action.

I claim:

1. In a tire protector, the combination of cover members comprising a series of coöperating segments each formed of a tread member having reflexed edges and a neck member, the tread member of each segment overlapping the neck member of its contiguous segment, means to secure said overlapping segments together comprising a slot disposed circumferentially of the wheel on the tread member of one segment, a pin on the neck member of the coöperating segment mounted in said slot, side plates, reflexed edges on said side plates engaging the reflexed edges of the tread members and radial slots in said side plates to receive said pins, substantially as set forth and for the purposes specified.

2. In a tire protector, the combination of a cover comprising a series of coöperating segments each formed of a tread member and integral neck member, the tread member of one segment overlapping the neck member of its contiguous segment, the tread member having an inwardly extending lug having a slot therein and the neck member having an inwardly extending lug provided with an outwardly extending pin thereon adapted to enter and engage said slot, an outwardly extending flange on said tread member, side members of angular formation, an inwardly extending flange on each side member adapted to engage and coöperate with the flange on one of said tread members and slots in the side members to receive said pins and to permit of radial clearance, substantially as set forth.

FRANK H. BRUEGGEMANN.

Witnesses:
J. W. HEINTZMAN,
HARRY P. ROHMANN.